United States Patent
Hjelm et al.

(10) Patent No.: US 6,647,067 B1
(45) Date of Patent: Nov. 11, 2003

(54) METHOD AND DEVICE FOR REDUCING CROSSTALK INTERFERENCE

(75) Inventors: Mikael Hjelm, Västerås (SE); Mikael Rudberg, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/536,688

(22) Filed: Mar. 28, 2000

(30) Foreign Application Priority Data

Mar. 29, 1999 (SE) ............................................... 9901141

(51) Int. Cl.[7] .............................................. H04L 27/28

(52) U.S. Cl. ..................... 375/260; 375/257; 370/201; 379/417

(58) Field of Search ............................... 375/219, 220, 375/222, 257, 258, 227, 260, 285, 288, 296, 346, 348, 350; 370/201, 276, 280, 282, 286, 290, 291, 294, 484, 526; 455/295, 296, 307, 67.1, 67.3; 333/142, 143, 200, 24 C; 379/399.01, 398, 416, 417, 406.01, 406.06, 406.08, 406.12, 406.14

(56) References Cited

U.S. PATENT DOCUMENTS

| | | | | |
|---|---|---|---|---|
| 4,688,245 A | * | 8/1987 | Schenk | 379/406.08 |
| 5,181,198 A | * | 1/1993 | Lechleider | 370/286 |
| 5,483,551 A | * | 1/1996 | Huang et al. | 375/219 |
| 5,887,032 A | * | 3/1999 | Cioffi | 375/257 |
| 6,144,695 A | * | 11/2000 | Helms et al. | 375/222 |
| 6,205,220 B1 | * | 3/2001 | Jacobsen et al. | 379/417 |
| 6,236,726 B1 | * | 5/2001 | Darveau | 379/417 |
| 6,285,653 B1 | * | 9/2001 | Koeman et al. | 370/201 |
| 6,317,495 B1 | * | 11/2001 | Gaikwad et al. | 379/417 |
| 6,507,620 B1 | * | 1/2003 | Usui | 375/257 |

FOREIGN PATENT DOCUMENTS

| | | |
|---|---|---|
| WO | WO 97/06619 | 2/1997 |
| WO | WO 98/10528 | 3/1998 |

OTHER PUBLICATIONS

Tomazic, S.; Umek, A., "Crosstalk in Digital Transmission over Subscriber Cable", 1989, Proceedings, MELECON '89, pp.: 605–608.*

Joshi, V.; Falconer, D.D., "Sequence Estimation Techniques for Digital Subscriber Loop Transmission with Crosstalk Inteference", Sep. 1990, Communications, IEEE Transactions, vol.: 38, pp.: 1367–1374.*

Michael L. Honig et al. "Suppression of Near– and Far–End Crosstalk by Linear Pre– and Post–Filtering", IEEE Journal on Selected Areas of Communication vol. 10, No. 3, pp. 614–621, Apr. 1992.

(List continued on next page.)

Primary Examiner—Chi Pham
Assistant Examiner—Khanh C. Tran
(74) Attorney, Agent, or Firm—Burns, Doane, Swecker & Mathis, L.L.P.

(57) ABSTRACT

In a transmission system which makes use of frequency translated signals, said system having a plurality of lines, a method for reducing crosstalk induced on a signal on a first line of said plurality of lines by a signal on a second line of said plurality of lines, comprising estimating a complex coupling factor for the crosstalk, which when multiplied by the signal on the second line estimates the induced crosstalk; and subtracting the estimated induced crosstalk from the signal on the first line. The invention comprises an approximation method for multiplying the complex coupling factor by the signal on the second line that operates on the signal on the second line through pre-rotation, scaling and multiplication by a complex number according to the coupling factor, said complex number being chosen from a bank of predetermined complex numbers so as to obtain the best approximation possible.

28 Claims, 6 Drawing Sheets

OTHER PUBLICATIONS

John A. C. Bingham, "Multicarrier Modulation for Data Transmission: An Idea Whose Time Has Come", IEEE Communications Magazine, pp. 5–8 and 11–14, May 1999.

Jack E. Volder, "The CORDIC Trigonometric Computer Technique", The Institute of Radio Engineers Transactions on Electronic Computers EC–8, pp. 226–230, 1959.

* cited by examiner

METHOD AND DEVICE FOR REDUCING CROSSTALK INTERFERENCE

TECHNICAL FIELD OF THE INVENTION

The present invention relates to a method and a device for reducing crosstalk interference in a transmission system which makes use of frequency translated signals, particularly a discrete multi tone (DMT) modulated transmission system or an OFDM (Orthogonal Frequency Division Multiplex) transmission system, in. which the modulation may be effected using a fast inverse Fourier transform (IFFT). The invention relates further to the transmission system itself, and to a transceiver of said transmission system.

DESCRIPTION OF RELATED ART

Digital data duplex transmission systems are currently being developed for high-speed communication. Standards for high-speed data communication over twisted-pair phone lines that have been developed include Asymmetric Digital Subscriber Lines (ADSL) and Very High Speed Digital Subscriber Lines (VDSL).

A standardized ADSL system (ANSI T1.413-1995, ATIS Committee T1E1.4), providing transmission at rates up to 8 Mbit/s over twisted-pair phone lines, defines the use of a discrete multi tone (DMT) system that uses 256 carriers or sub-channels, each 4.3125 kHz wide, in the downstream direction. In this context the downstream direction is defined as transmission from a central office (typically owned by a telephone company) to a remote location such as an end-user (i.e. residence or business user). The standard defines also the use of an oppositely directed (i.e. in the upstream direction) signal at a rate of 16 to 800 kbit/s, which is considerably lower than in the downstream direction.

A corresponding VDSL standard is intended to provide transmission up to 25.96, and preferably up to 51.92 Mbit/s, in the downstream direction and requires generally shorter phone lines than what is permitted using ADSL. Another system that is similar to VDSL is referred to as Fiber To The Curb (FTTC).

Several modulation schemes have been proposed for use in the standards mentioned above, of which most use frequency division multiplexing of the upstream and downstream directions. Other modulation systems proposed for the VDSL and FTTC systems, including multi-carrier transmission schemes such as DMT and single carrier transmission systems such as Quadrature Amplitude Modulation (QAM), use non-overlapping periodic synchronized upstream and downstream communication periods separated by a silent period. Such a system is referred to as a "ping pong" based data transmission system.

A common feature of all the above mentioned systems is that twisted-pair phone lines are used at least a part of the transmission medium that connects a central office (e.g. telephone company) to users (e.g. residence or business). It is difficult to avoid twisted-pair wiring from all parts of the interconnecting transmission medium. Even though fiber optics may be available from a central office to a curb near a user, twisted-pair phone lines are used to bring signals from the curb into the users residence or business.

The twisted-pair phone lines are grouped in a binder. While the twisted-pair phone lines are within the binder, the binder provides reasonably good protection against external electromagnetic interference. However, within the binder, the twisted-pair phone lines, being located close together, induce electromagnetic interference on each other. This type of electromagnetic interference is known as crosstalk interference. As the frequency of transmission increases, the crosstalk becomes substantial. As a result, the data signals being transmitted over the twisted-pair phone lines at high speeds can be significantly degraded by the crosstalk caused by other twisted-pair phone lines in the binder. As the speed of data transmission increases, the problem gets worse.

Conventional crosstalk cancelers have been used to reduce crosstalk. The difficulty with such conventional crosstalk cancelers is that they are very complex and consume large amounts of resources. For instance, the approach described in M. L. Honig et al., "Suppression of Near- and Far-end Crosstalk by Linear Pre- and Post-filtering, "IEE Journal on Selected Areas in Communication, Vol. 10, No. 3, pp. 614–629, April 1992, requires so much processing to implement the filtering that its benefits are overshadowed by the processing burdens.

PCT application WO 98/10528 (inventor J. F. Cioffi) proposes a system for removing crosstalk by adaptively estimating the crosstalk as induced by other of the interfering lines and canceling the crosstalk by using the estimated crosstalk. The adaptive scheme avoids processing when it is not justified in view of its processing costs. The document does not, however, address problems associated with the computational complexity of the reduction as such.

Hence, the problem of using twisted-pair phone lines at high frequency data transmission rates, such as those available using ADSL and VDSL, is that crosstalk, particularly NEXT from other lines in a binder, becomes a substantial impediment to proper reception of the transmitted data signals. Conventional NEXT cancelers are complex and do need considerable processing power for implementing the reduction.

Also in orthogonal frequency division multiplexed (OFDM) transmission systems, crosstalk may occur which systems correspondingly also needs large amounts of processing power to handle the crosstalk.

SUMMARY OF THE INVENTION

It is consequently an object of the present invention to provide a method for reducing crosstalk interference in a transmission system which makes use of frequency translated signals, particularly a discrete multi tone (DMT) modulated transmission system or an OFDM (Orthogonal Frequency Division Multiplex) transmission system, that uses less computational power as compared with known practice.

It is a further object of the invention to provide the estimated crosstalk interference at a fast rate.

It is yet a further object of the invention to provide the reducing of crosstalk interference as being implemented at least partly in specific hardware.

These objects among others are, according to one aspect of the invention, fulfilled by a method for reducing crosstalk interference induced on a signal on a first line by a signal on a second line, comprising following steps. A complex coupling factor for the crosstalk interference, which when multiplied by the signal on the second line estimates the induced crosstalk interference, is estimated, the complex coupling factor is multiplied by the signal on the second line through an approximation method operating on the signal on the second line including pre-rotation, scaling and multiplication by a complex number according to the coupling factor, whereby the complex number is chosen from a bank of predetermined complex numbers so as to obtain the best approximation possible. Finally, the product, i.e. the estimated induced crosstalk interference, obtained is subtracted from the signal on the first line.

The number of complex number provided in the bank may be calculated from a maximum acceptable error in the computation.

According to a second aspect of the present invention, there is provided a method for reducing crosstalk interference induced on a signal $S_N$ on a first line N by signals $D_1, \ldots, D_{N-1}$, each on a respective line $1, \ldots, N-1$.

The method comprises following steps. A coupling factor $\alpha'_{1\_N}, \ldots, \alpha'_{N-1\_N}$ is associated with the respective line $1, \ldots, N-1$, said coupling factor $\alpha'_{j\_N}$, $1 \leq j \leq N-1$, being a complex number and when multiplied by the signal $D_j$, $1 \leq j \leq N-1$, on its associated line j, $1 \leq j \leq N-1$, estimating the crosstalk interference $I_{j\_N}$ induced on the signal $S_N$ on the first line N by the signal $D_j$ on its associated line j. The crosstalk interference $I_N$ on the signal $S_N$ on the first line N is reduced by subtracting an estimated crosstalk interference $I'_N$ from the signal $S_N$ on the first line N, said estimated crosstalk interference $I'_N$ being computed from said coupling factors $\alpha'_{1\_N}, \ldots, \alpha'_{N-1\_N}$, and said signals $D_1, \ldots, D_{N-1}$ on the respective line $1, \ldots, N-1$ in the manner described below.

Each of the signals $D_1, \ldots, D_{N-1}$ on the respective line $1, \ldots, N-1$ is pre-rotated and scaled according to the coupling factor $\alpha'_{1\_N}, \ldots, \alpha'_{N-1\_N}$ associated with the respective line, whereafter all of the pre-rotated and scaled signals $D^*_1, \ldots, D^*_{N-1}$, obtained are summed. The sum $\Sigma D^*$ obtained is multiplied by a single complex number $\beta_N$ and the product obtained is used as the estimated crosstalk interference $I'_N$ in said above subtraction.

According to a third aspect of the present invention there is provided a method for reducing crosstalk interferences induced by a signal $D_N$ on a first line N on signals $S_1, \ldots, S_{N-1}$ on a respective line $1, \ldots, N-1$, comprising following steps.

Coupling factors $\alpha'_{N\_1}, \ldots, \alpha'_{N\_N-1}$ are associated with the first line N; each of said coupling factors is a complex number and when multiplied by the signal $D_N$ on the first line N it estimates the respective crosstalk interference $I_{N\_1}, \ldots, I_{N\_N-1}$ induced on each of the signals $S_1, \ldots, S_{N-1}$ on the respective line $1, \ldots, N-1$ by the signal $D_N$ on the first line N. The respective crosstalk interference $I_{N\_1}, \ldots, I_{N\_N-1}$ on each of the signals S1, ..., $S_{N-1}$ on the respective line $1, \ldots, N-1$ is reduced by subtracting a respective estimated crosstalk interference $I'_{N\_1}, \ldots, I'_{N\_N-1}$ from each of the signals $S_1, \ldots, S_{N-1}$ on the respective line $1, \ldots, N-1$, said respective estimated crosstalk interference $I'_{N\_1}, \ldots, I'_{N\_N-1}$ being computed from the respective coupling factor $\alpha'_{N\_1}, \ldots, \alpha'_{N\_N-1}$, and the signal $D_N$ on the first line N in the manner described below.

The signal $D_N$ on the first line N is multiplied by a single complex number $\beta_N$ yielding a product $D^{}_N$, whereafter the product $D^{}_N$ is replicated for obtaining N-1 equal products $D^{}_{N\_1}, \ldots, D^{}_{N\_N-1}$. The respective product $D^{}_{N\_1}, \ldots, D^{}_{N\_N-1}$ is pre-rotated and scaled according to the respective coupling factor $\alpha'_{N\_1}, \ldots, \alpha'_{N\_N-1}$, and, finally, the respective pre-rotated and scaled products obtained are used as the respective estimated crosstalk interference $I'_{N\_1}, \ldots, I'_{N\_N-1}$ in the respective subtraction.

Preferably, the pre-rotating is performed by mirroring in the real and/or the imaginary and/or the 45° axis.

The complex multiplications may be performed by using a vector rotation method, particularly the CORDIC (COordinate Rotation DIgital Computer) vector rotation method.

The scaling is preferably performed by multiplying by real numbers chosen from a bank of predetermined real numbers so as to obtain the best approximation possible.

Furthermore, the invention comprises a device and a transmitter adapted for performing the method according to any of the three first aspects of the invention, and a transmission system comprising a device or a transmitter of above said kind.

An advantage of the present invention is that the computation of the estimated crosstalk interference is simple and rapid, thus permitting adaptive reduction of crosstalk interference in real time to accommodate, for example, changing transmitting conditions.

Another advantage of the invention is that the simplified procedures allows, at least partly, implementation using dedicated hardware for obtaining improved speed.

BRIEF DESCRIPTION OF THE DRAWINGS

The present invention will become more fully understood from the detailed description of embodiments of the present invention given hereinbelow and the accompanying FIGS. 1–9 which are given by way of illustration only, and thus are not limitative of the invention.

DETAILED DESCRIPTION OF EMBODIMENTS

In the following description, for purposes of explanation and not limitation, specific details are set fourth, such as particular hardware, applications, techniques, etc. in order to provide a thorough understanding of the present invention. However, it will be apparent to one skilled in the art that the present invention may be practiced in other embodiments that depart from these specific details. In other instances, detailed descriptions of well-known methods, protocols, devices, and circuits are omitted so as not to obscure the description of the present invention with unnecessary details.

Figure 1:
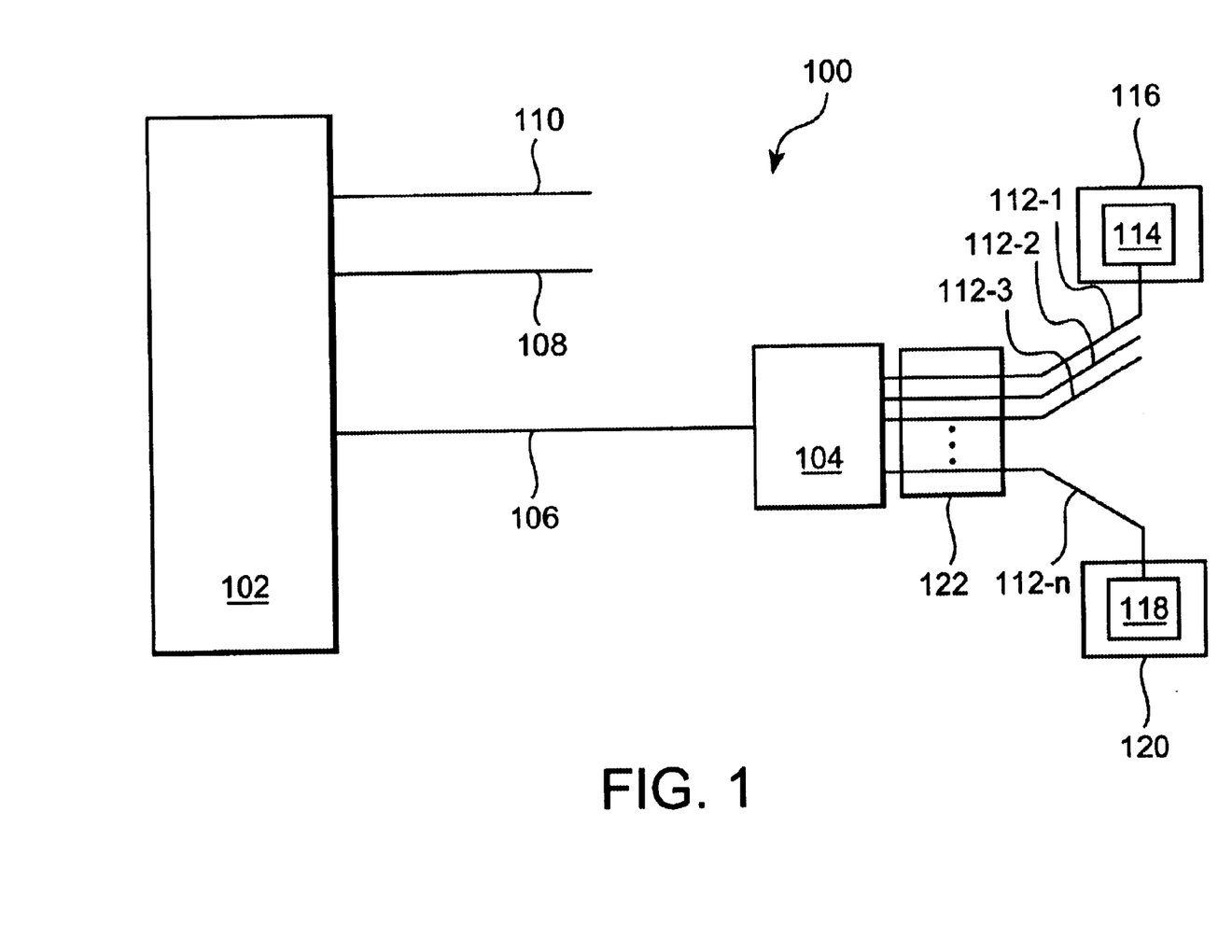
FIG. 1 shows a block diagram of an exemplary communications network suitable for implementing the invention.

With reference to FIG. 1, which is a block diagram of an exemplary DMT-based communications network 100 suitable for implementing the invention, a central office (CO) 102 serves a plurality of distribution posts, such as processing and distribution unit 104, to provide data transmission to/from central office 102 from/to various remote units. Central office 102 and processing and distribution unit 104 are interconnected by a high-speed multiplexed transmission line 106, e.g. a fiber optic line in which case processing and distribution unit 104 typically is referred to as an optical network unit (ONU). Lines 108 and 110 indicate that central office 102 may as well be connected to other processing and distribution units (not shown).

Processing and distribution unit 104, which comprises digital DMT-based transceivers, e.g. modems (not shown), serves a plurality of discrete subscriber lines 112-1 to 112-n, each of which typically serves a single end user. Particularly, first 116 and second 120 end users have remote units 114, 118, respectively, suitable for duplex or full duplex communication with processing and distribution unit 104 at high bit rates. Remote units 114 and 118 may be incorporated in a variety of devices such as for instance telephones, televisions, monitors, computers etc. It should be noted that several remote units may be connected to a single subscriber line.

Subscriber lines 112 served by processing and distribution unit 104 are bundled in a shielded binder 122 as they leave said unit 104. The shielding of said binder 112 generally serves as a good insulator against electromagnetic interference from external sources. However, the shielding is not effective against interference internally between lines inside binder 122. At this tightly bundled place, the majority of the crosstalk interference, such as the NEXT interference, occurs through such capacitive couplings. When data is transmitted on some of the subscriber lines 112, while other lines 112 are receiving data, the crosstalk interference may become a substantial impediment to correctly receive data.

One technique currently used to reduce this problem is to synchronize the downstream transmission from processing and distribution unit 104 and separate it in time from the relatively weaker upstream transmitted signals. In such a way the relatively weak signals from the remote units are at least not disturbed by the sending transceivers in the processing and distribution unit. This scheme is, however, no solution to the interference between two sending transceivers. Also, in systems where different levels of service are offered to customers the downstream and upstream transmissions may overlap. In general, to reduce interference a crosstalk canceler for subscriber lines 112 is needed.

Figure 2:
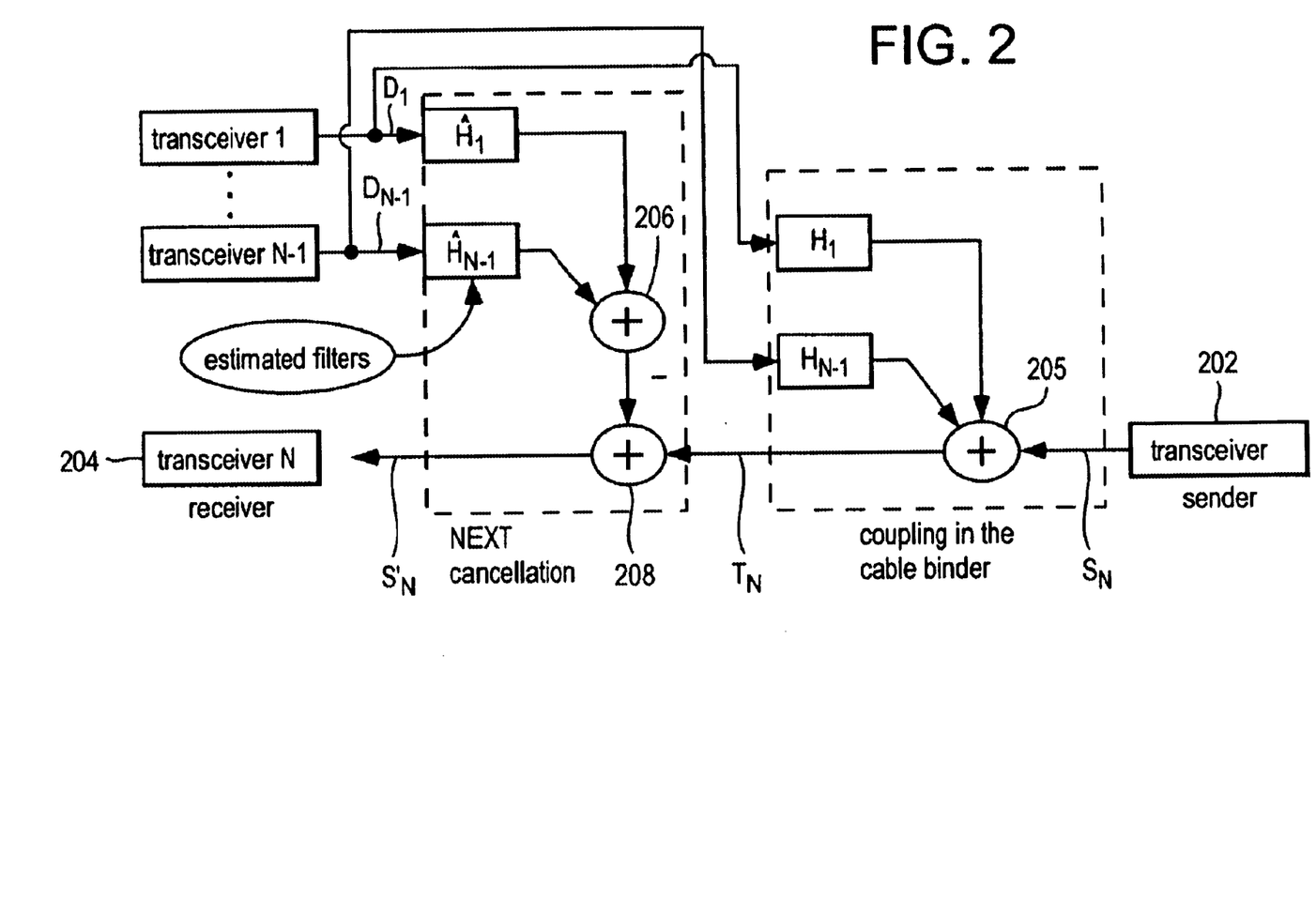
FIG. 2 shows a conceptual diagram of crosstalk induced on a line in a cable binder by several disturber lines and of crosstalk reduction on said line.

Referring now to FIG. 2, which is a conceptual diagram of near-end crosstalk (NEXT) and of crosstalk reduction, the concept of conventional crosstalk canceling will be described. A transceiver 202, e.g. in a remote unit, sends in upstream direction a signal on line or channel N towards receiving transceiver N 204, e.g. located in the processing and distribution unit, said signal being disturbed by signals on several disturber lines 1, . . . , N−1 as sent in downstream direction from transceiver 1, . . . , N−1, e.g. located in the processing and distribution unit.

The induced near-end crosstalk (NEXT) occurs through coupling between the lines, e.g. in a binder. It shall be appreciated that there is another crosstalk model, called far-end crosstalk (FEXT), that is less problematic and not described in this instance. Nonetheless the invention is well suited to handle also this kind of crosstalk.

The crosstalk and crosstalk cancellation is modeled as will be described below with reference to FIG. 2. The signals being transmitted on lines 1, . . . , N are DMT symbols that are transmitted with 256 tones. Transmission on lines 1, . . . , N−1 causes NEXT interferences on the signals received on line N. Although crosstalk interferences are induced on lines 1, . . . , N−1 as well, such crosstalk is for purposes of simplicity currently not considered. The NEXT interferences, shown as transfer functions $H_1, \ldots, H_{N-1}$ of the respective signals on lines 1, . . . , N−1 added to the signal at 205, may be canceled or at least reduced by a NEXT canceler (software or hardware implemented) that uses estimated transfer functions $\hat{H}_1, \ldots, \hat{H}_{N-1}$ of transfer functions $H_1, \ldots, H_{N-1}$. These estimated interferences are added in an adder 206 and an adder/subtractor 208 subtracts the estimated crosstalk from the received signals, thereby eliminating or mitigating the NEXT interference.

In detail the crosstalk canceling is performed as described in the following. Denote the signals in the downstream direction on lines 1, . . . N−1 by $D_{1,i}, \ldots, D_{N-1,i}$, and the signal in the upstream direction on line N by $S_{N,i}$, the value i indicates the DMT tone to which the canceling refers and is omitted in FIG. 2. Due to crosstalk interference a portion of each transmitted signal couples over to the N'th line and corrupts the corresponding signal $S_{N,i}$. The crosstalk interferences from the disturbing signals are denoted $I_{1\_N,i}, \ldots, I_{N-1\_N,i}$, where the sign _ should be interpreted as "interfering" or "disturbing". The corrupted signal in the upstream direction, denoted $T_{N,i}$ is determined as $$T_{N,i} = S_{N,i} + I_{1\_N,i} + \ldots + I_{N-1\_N,i}$$

The crosstalk interferences are modeled by transfer functions $H_1, \ldots, H_{N-1}$ of the respective disturbing signals $D_{1,i}, \ldots, D_{N-1,i}$ and may be computed as $$I_{j\_N,i} = \alpha_{j\_N,i} * D_{j,i}, j=1, \ldots, N-1$$

where $\alpha_{j\_N,i}$ is a coupling coefficient from the j'th line to the N'th line.

The invention then operates on the corrupted signal $T_{N,i}$ to reduce the corruption. The coupling coefficients $\alpha_{1\_N,i}, \ldots, \alpha_{N-1\_N,i}$ are estimated and the estimations, denoted by $\alpha'_{1\_N,i}, \ldots, \alpha'_{N-1\_N,i}$, are used in order to produce estimated crosstalk interferences $$I'_{j\_N,i} = \alpha'_{j\_N,i} * D_{j,i}, j=1, \ldots, N-1$$

This is in FIG. 2 indicated by the transfer functions $\hat{H}_1, \ldots, \hat{H}_{N-1}$. The estimated crosstalk $I'_{N,i}$ is the sum $I'_{1\_N,i} + \ldots + I'_{N-1\_N,1}$ 206 of the individual estimated interferences and is then subtracted 208 from the corrupted signal $T_{N,i}$ so as to produce a compensated signal $S'_{N,i}$. This compensated signal may be referred to as $S_{N,i} + E_{N,i}$, $E_{N,i}$ being a remaining small error due to imperfect crosstalk cancellation.

The present invention is not concerned with the estimation of the coupling coefficients as such, but with the computation of the compensated signal $S'_{N,i}$ given the estimated coupling coefficients.

In a DMT (or OFDM) system the filtering, i.e. the computation of the estimated crosstalk, can be made in the frequency domain by, for each carrier or tone and for each disturbing line or signal, performing a complex multiplication. The estimated coupling coefficient is here a complex number and as being multiplied by the disturbing signal, itself being regarded as a complex number, four multiplications of real numbers have to be performed.

In a system with several lines disturbing each other, it will be a large number of filter operations that has to be made. For instance, having N lines disturbing each other, N*(N−1) filter operations or complex multiplications for each carrier are needed, which is computationally time consuming to perform. For systems at very high speed, this is hardly possible to implement using current technologies.

The present invention seeks to overcome this by providing an approximation computation method that requires substantially, up to 50%, less processing power, to the cost of a slight deterioration in crosstalk reduction.

First Embodiment

Figure 3:
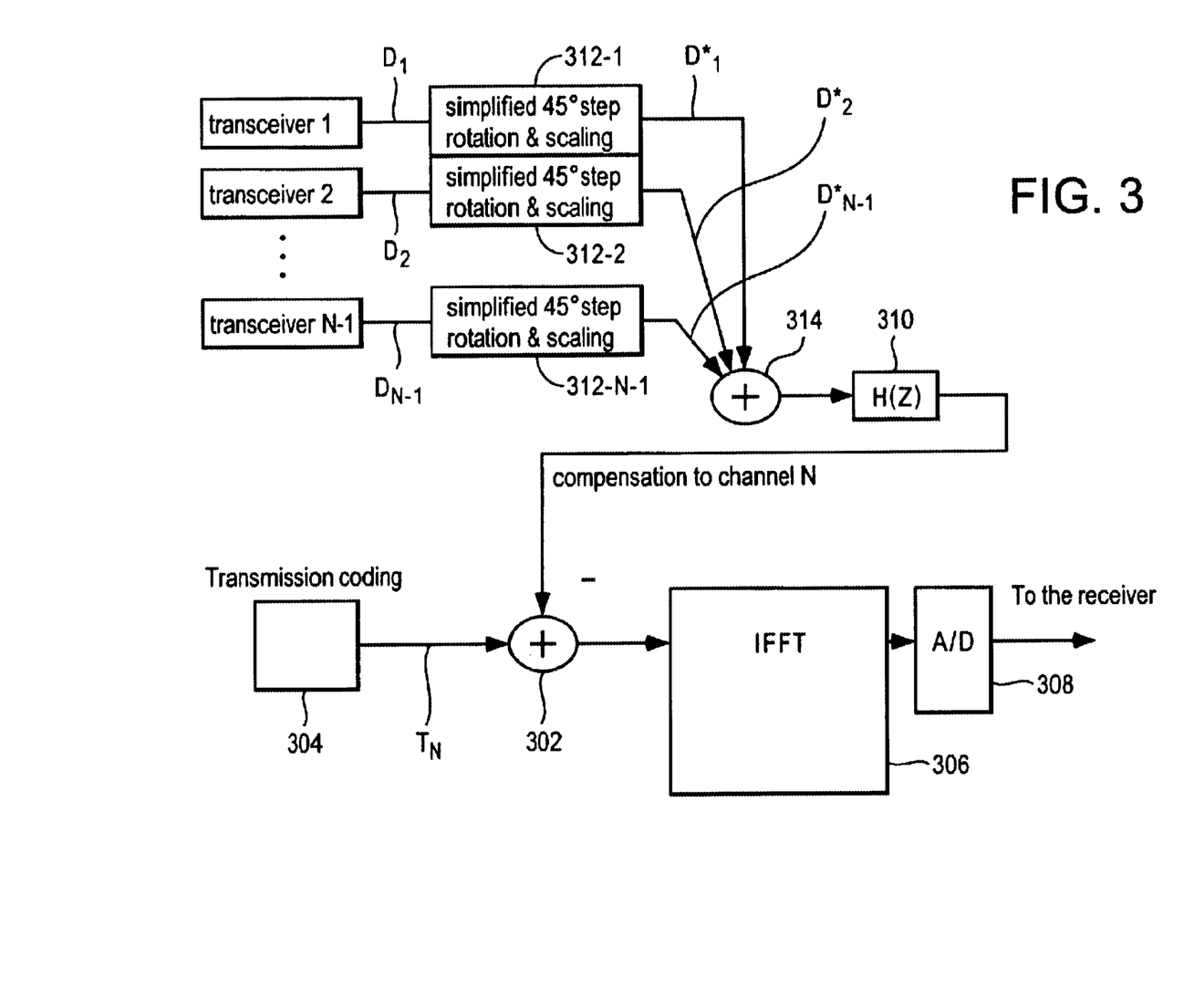
FIG. 3 shows a conceptual diagram of crosstalk reduction in a line according to a first embodiment of the present invention.

Sharing of Main Rotations among Coupling Factors Associated with a Single Disturbed Line FIG. 3 shows, accordingly, a conceptual diagram of crosstalk reduction on a line according to a first embodiment of the present invention.

Compensation, i.e. crosstalk reduction, of a signal on a line or channel N is preferably introduced at 302, i.e. in the transmitter N after transmission coding 304, but before modulation by the fast inverse Fourier transform (IFFT) 306 and analog-to-digital conversion 308, where the signal still is in the frequency plane. Detailed descriptions of the principle of multitone modulation as such may be found in J. A. C. Bingham, *Multicarrier modulation for data transmission: an idea whose time has come*, IEEE Communications Magazine, May 1990, pp. 5–14, and in references therein.

The inventive concept is to reduce the number of complex multiplications by using a finite number of filters, i.e. predetermined fixed or adaptive filters. In FIG. 3 only one complex multiplication is performed at 310 for all N−1 disturbing signals $D_1, D_2, \ldots, D_{N-1}$ for each carrier or tone. Note that the tone index i is dropped here for purposes of simplicity. If not otherwise indicated, it is to be assumed that the discussion refers to a single tone only.

The disturbing signals $D_1, D_2, \ldots, D_{N}-1$, each of which is subject to simple operations 312-1, 312-2, . . . , 312-N-1, e.g. simplified 45° step rotating, also called pre-rotation, and appropriate scaling according to a respective coupling factor $\alpha'_{j\_N}$, $1 \leq j \leq N-1$ associated with the respective signal $D_j$ and line j (to be described in detail below), are added at 314, whereafter the total crosstalk interference on signal $S_N$ on line N is computed by multiplying the resulting sum and a filter function, i.e. a complex number at 310. The crosstalk is subtracted from signal $T_N$ at 302.

A detailed description of operations 312, i.e. pre-rotation and scaling, as well as how to choose filter function(s) will be found below.

A multiplication by a complex number, e.g. a coupling factor, can be regarded as a rotation together with a scaling. In the present invention the rotation operation is divided into a pre-rotation and a main rotation. The pre-rotation is preferably performed in such way that the main rotation always becomes less than 45°. The pre-rotation can be achieved in a very simple way by swapping real and imaginary parts and/or swapping signs of the real and/or imaginary parts.

Figure 4:
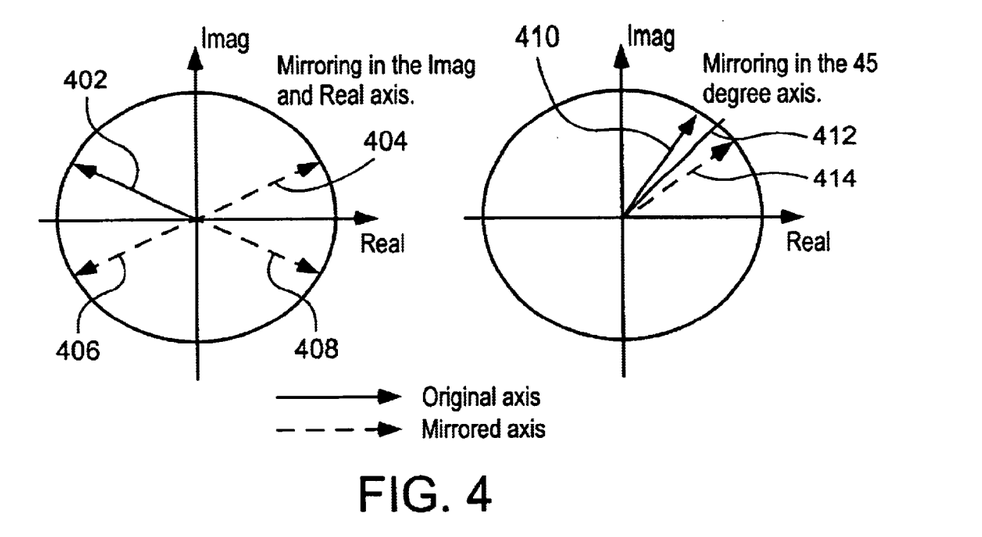
FIG. 4 illustrates the concept of pre-rotation by mirroring in the real, imaginary and 45° axis as forming part of the inventive crosstalk reduction.

Turning to FIG. 4, which illustrates the concept of pre-rotation by mirroring in the real, imaginary and 45° axis as forming part of the inventive crosstalk reduction, it is seen in the left-hand part of the Figure, that swapping the sign of the real part of a signal 402 will mirror the signal in the imaginary axis, resulting in 404, and swapping the sign of the imaginary part of the signal 402 will mirror the vector in the real axis, resulting in 406. Swapping signs of both the real and imaginary parts of signal 402 results in 408. In the right-hand part of FIG. 4 is shown that swapping the real and imaginary parts will result in mirroring of the complex signal vector 410 in the 45° axis 412, thus resulting in 414.

By performing appropriate pre-rotation of the kind described, it may be assured that only main rotations between 0 and 45° are needed to be performed.

Appropriate pre-rotation for signal vectors lying in respective region is performed by taking the steps as ticked in Table 1 below. First half of each quadrant refers to first 45° of each quadrant.

TABLE 1

| Location of signal vector | Mirroring in real axis | Mirroring in imaginary axis | Mirroring in 45° axis |
| --- | --- | --- | --- |
| First quadrant, first half | | | |
| First quadrant, second half | | | X |
| Second quadrant, first half | | X | X |
| Second quadrant, second half | | X | |
| Third quadrant, first half | X | X | |
| Third quadrant, second half | X | X | X |
| Fourth quadrant, first half | X | | X |
| Fourth quadrant, second half | X | | |

The scaling factor may in a first approximation be the length of the coupling factor vector. However, in order to minimize the error introduced due to angle mismatch resulting from imperfect rotation the scaling factor has to be adjusted appropriately.

Figure 5:
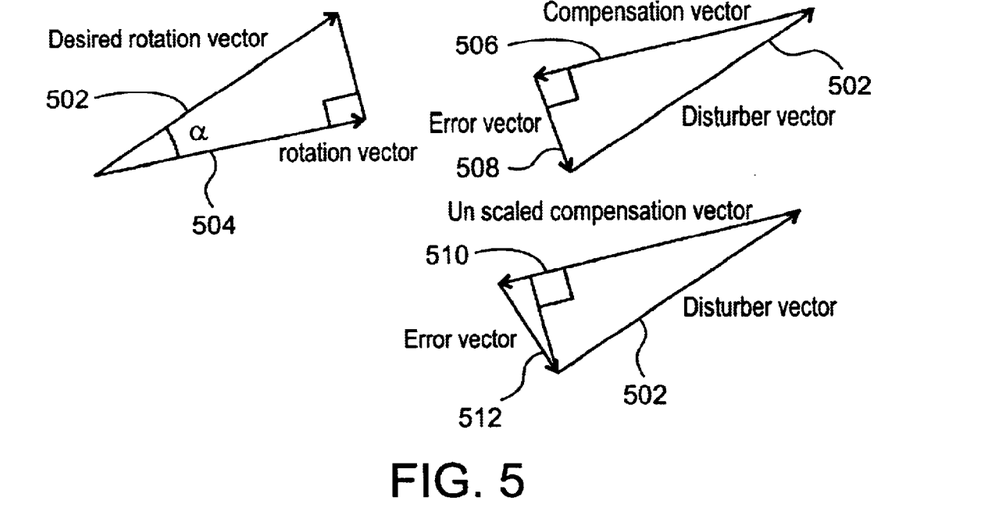
FIG. 5 illustrates effects of inventive scaling and rotation on the error obtained.

In FIG. 5 is illustrated the effects of scaling and imperfect rotation on the error. A desired rotation vector 502, i.e. a disturber vector is approximated by rotation vector 504. Accordingly, said disturber vector 502 is compensated by compensation vector 506. The error introduced hereby, is indicated by 508. In order to minimize the resulting error vector 508, the scaling factor is adjusted by the cosine of the angle that differentiates the approximated compensation rotation and the perfect rotation.

The adjustment is found in the following discussion. Consider the crosstalk interference v from one disturber $ae^{j\omega}$ in the frequency plane.

$$\bar{V} = ae^{j\omega}H(e^{j\omega}) = ae^{j\omega}he^{j\theta} = ah(\omega)e^{j(\omega+\theta)}$$

where H is the Fourier transform of the crosstalk, h(($\omega$)) is the amplitude and $\theta$ is the rotation angle at the given frequency $\omega$.

When the crosstalk is to be reduced one wants to subtract a vector that is identical to v. But if there is a mismatch in the angle $\theta$, as might be the case in the present invention, a remaining crosstalk disturbance or error e is obtained according:

$$\bar{e} = ae^{j\omega}H(e^{j\omega}) - ae^{j\omega}\hat{H}(e^{j\omega}) = ae^{j\omega}he^{j\theta} - ae^{j\omega}\hat{h}e^{j\hat{\theta}} = ae^{j\omega}(he^{j\theta} - \hat{h}e^{j\hat{\theta}})$$

The magnitude of the error vector e is then $$|\bar{e}| = \sqrt{ae^{j\omega}(he^{j\theta} - \hat{h}e^{j\hat{\theta}}) \times ae^{-j\omega}(he^{-j\theta} - \hat{h}e^{-j\hat{\theta}})}$$

$$= \sqrt{a^2(h^2 - h\hat{h}e^{j(\theta-\hat{\theta})} - h\hat{h}e^{-j(\theta-\hat{\theta})} + \hat{h}^2)}$$

$$= \sqrt{a^2(h^2 + \hat{h}^2 - 2h\hat{h}\cos(\theta-\hat{\theta}))}$$

Searching for the minimum gives $$\frac{d}{d\hat{h}}(|\bar{e}|^2) = 2a^2\hat{h} - 2a^2 h\cos(\theta - \hat{\theta}) = 0$$

$$\hat{h} = h\cos(\theta - \hat{\theta})$$

Hence, to minimize the error vector the scaling coefficient are chosen as h^=h cos(Δθ), where Δθ is the angle difference. The size of the error then becomes $$|\bar{e}| = \sqrt{a^2(h^2 + (h\cos(\theta - \hat{\theta}))^2 - 2h\hat{h}\cos(\theta - \hat{\theta})\cos(\theta - \hat{\theta}))}$$

$$= \sqrt{a^2 h^2 (1 + \cos^2(\theta - \hat{\theta}) - 2\cos^2(\theta - \hat{\theta}))}$$

$$= \sqrt{a^2 h^2 (1 - \cos^2(\theta - \hat{\theta}))} = ah\sin(\theta - \hat{\theta})$$

as may be seen geometrically in FIG. 5. In the bottom of the same Figure is shown how an unscaled compensation vector 510 makes the error vector 512 larger.

Returning now to FIG. 3, each disturbing signal $D_j$, j=1, ..., N−1, is, in accordance with the discussion above, pre-rotated and scaled according to its associated coupling factor $\alpha'_{j\_N}$, j=1, ..., N−1, resulting in signals $D^*_j$, j=1, ..., N−1. In such a way, each pre-rotated and scaled disturbing signal $D^*_j$, j=1, ..., N−1 remains to be multiplied by a corresponding remaining vector in a main rotation, said remaining vector being of unity length and lying in the angle range 0–45°, in order to reach the respective estimated crosstalk interferences $I'_{j\_N}$, j=1, ..., N−1, see discussion above with reference to FIG. 2.

The inventive concept is to reduce the number of different remaining vectors, or main vectors, and in the embodiment according to FIG. 3 only one main vector is used. Hereby, all pre-rotated and scaled disturbing signals $D^*_1, D^*_2, ..., D^*_{N-1}$, are summed and the sum $\Sigma D^*_j$, j=1, ..., N−1 obtained is multiplied by a single main rotation vector $\beta_N$. The vector $\beta_N$ may be chosen in an appropriate one of several ways. For instance, it may be chosen as $\beta_N = e^{i\pi 22.5/180}$ or as $\beta_N = e^{i\pi 0.5 * \phi/180}$, where φ is the maximum angle found among the remaining vectors that are to be approximated by $\beta_N$. $\beta_N$ may alternatively be chosen in other ways, particularly if the angles among the remaining vectors are known to be distributed nonuniformly.

In a more generalized version of the invention a plurality of main vector s are provided and used for the main rotation. They are preferably, but not necessarily, uniformly distributed in the first half of the first quadrant and the number of main vectors are preferably determined from a maximum accepted error of the computation; the higher the number of vector s is, the lower error is achieved, but to the cost of increased computation. Here, the pre-rotated and scaled disturbing signals $D^*1, D^*_2, ..., D^*_{N-1}$, are grouped in different sets, i.e. associated with different main rotation vectors, according to their remaining main rotations, i.e. each pre-rotated and scaled disturbing signal is put in the set associated with the main rotation vector that minimizes the error introduced. Finally, the signals in the respective set are summed and multiplied by the main rotation vector associated with the set.

Figure 6:
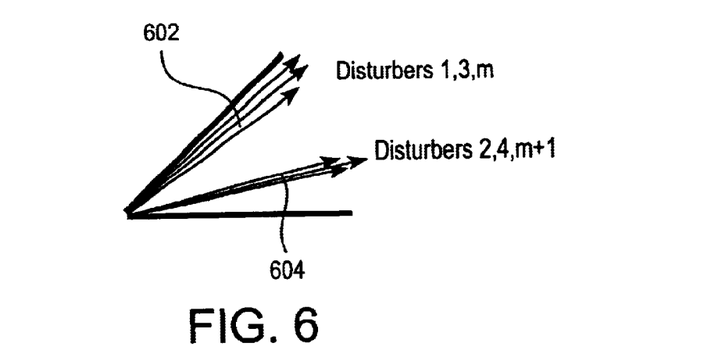
FIG. 6 illustrates the principle of grouping of disturbing vectors in accordance with the invention.

FIG. 6 illustrates an example of grouping of disturbing vectors in accordance with this aspect of the invention. Pre-rotated and scaled disturbing signals associated with disturbers or remaining main rotation vectors 1, 3, m 602, all lying between 22.5 and 45°, are summed and the sum is multiplied by a first main vector $e^{i33.75\pi/180}$ (not shown) and pre-rotated and scaled disturbing signals associated with disturbers or remaining main rotation vectors 2, 4, m+1 604, all lying between 0 and 22.5°, are summed and the sum is multiplied by a second main vector $e^{i11.25\pi/180}$ (not shown).

The maximum errors as obtained for different number of main rotators are shown in Table 2 (assuming uniform distribution of main vectors in the first half of the first quadrant).

TABLE 2

| No. of main rotations | 2 | 3 | 5 | 8 | 10 |
|---|---|---|---|---|---|
| Maximum error (%) | 19.5 | 13 | 8 | 5 | 4 |

The method described above of equal spacing between the different rotations is only one possibility; another is to use an unequal spacing that, for instance, minimizes the mean square error of the measured crosstalk vectors.

When the number of lines become large it will still be a large amount of filtering that has to be performed. In practical applications we will have between 10 and 50 channels disturbing each other. We will have main rotation angles between 0 and φ, where φ is the maximum main rotation among remaining vectors.

Supposing that we can accept an error in the calculation of 10%, the angle mismatch in the rotation that is allowed will be arcsin(0.1)=5.7°. The maximum number of rotations that we have to perform for covering all remaining vectors for signal $T_N$ on line N is then preferably $n_\beta = \phi/(2*5.7°) = 45°/(2*5.7°) \leq 4$, since φ is less than or equal to 45° when combined with pre-rotation.

Each of the other lines 1, ..., N−1 has also N−1 lines that are more or less parasitically coupled to it. As a consequence, we actually have a set of main vectors or coupling filters for each disturbed line as well as for each tone on a line. Together a large set of coupling filters, or a filter bank, is obtained, which filters are to be synthesized in order to reduce all the crosstalk in the transmission system.

With 50 lines the number of complex multiplications are decreased from 50*49=2450 to 4*50=200 (still assuming an acceptable computation error of 10%). But we have introduced a scaling stage with the complexity of two multiplications of real numbers (or about one half complex multiplication). In total, we have 50*49 scaling stages, yielding a reduction from 40*50=2450 complex multiplications to 4*50+50*49/2=1425, or 42% reduction in number of operations (neglecting the simple pre-rotation that is easily implemented in hardware).

Second Embodiment

Sharing of Main Rotations among Coupling Factors Associated with a Single Crosstalk Inducing Line As described above a complex multiplication can be performed by a pre-rotation followed by a main rotation and a scaling. But, this is equivalent to perform the main rotation before the pre-rotation. Consequently, instead of sharing main vectors for a single disturbed line, sharing may be performed, according to a second embodiment of the present invention, by considering a single disturbing signal $D_j$ on a line j. This signal $D_j$ on line j has N−1 different associated coupling factors $\alpha'_{j\_1}, \alpha'_{j\_2}, ..., \alpha'_{j\_j-1}, \alpha'_{j\_j+1}, ..., \alpha'_{j\_N}$ for crosstalk interferences induced on lines 1, 2, ..., j+1, ..., N.

By grouping said coupling factors (according to their phases) into different sets, each set being associated with a single specific main rotation vector, and for each set multiplying the disturbing signal by the associated main rotation vector, the number of complex multiplications is reduced. Each main rotated disturbing signal may now be replicated according to the number of coupling factors in the set, pre-rotated, scaled and subtracted from respective disturbed signal.

This scheme may be advantageous in some circumstances, e.g. when it is assumed that the phases of coupling factors $\alpha'_{j\_1}, \alpha'_{j\_2}, \ldots, \alpha'_{j\_j-1}, \alpha'_{j\_j+1}, \ldots, \alpha'_{j\_N}$ are mutually more similar than those of coupling factors $\alpha'_{j\_N}, \alpha'_{2\_N}, \ldots, \alpha'_{N-1\_N}$. Also, this embodiment of the present invention is preferably used if an inventive approximation scheme is to be applied on the scaling stage, see discussion below.

Figure 7:
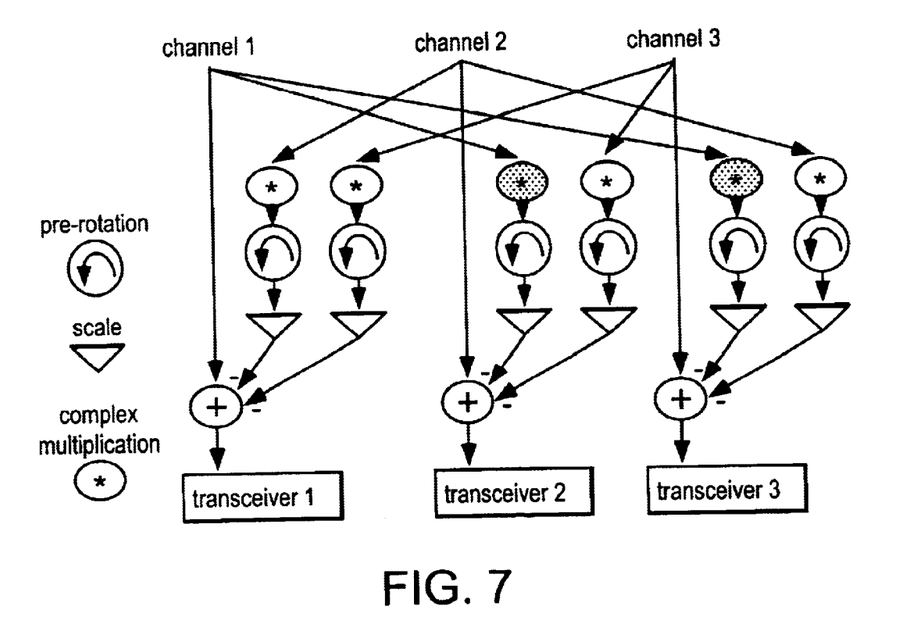
FIG. 7 shows an example of a conceptual diagram of crosstalk reduction according to a second embodiment of the present invention.
Figure 8:
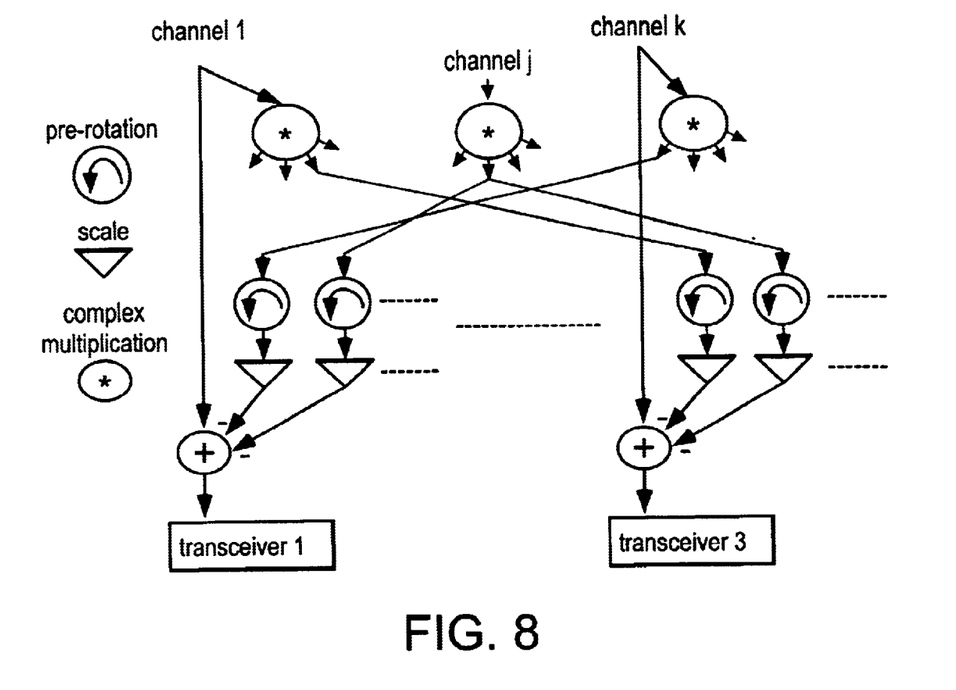
FIG. 8 shows another example of a conceptual diagram of crosstalk reduction according to a second embodiment of the present invention.

FIGS. 7 and 8 show examples of a conceptual diagram of crosstalk reduction according to this second embodiment of the present invention.

In FIG. 7 is shown a simple example of three lines or channels 1, 2, 3 that disturb each other through crosstalk interferences. The four crosstalk reduction operations complex multiplication (or main rotation), pre-rotation, scaling, and summation/subtraction are indicated by *, ◠, ▽, and +, respectively. Assuming now that main rotation angles for the coupling factors that couples crosstalk from channel 1 to channel 2 and from channel 1 to channel 3 may be approximated by a single vector, the operations (shaded in FIG. 7) are identical and the amount of computation is reduced.

In FIG. 8 another slightly more generalized example is shown. Three channels 1, j, k are shown, each having a bank of complex numbers, i.e. main rotation vectors, of which four are indicated and among which the coupling factors are to be distributed. In the example the coupling factors $\alpha'_{j\_1}$ and $\alpha'_{j\_k}$ (i.e. coupling factors that couple crosstalk interference from channel j to channels 1 and k, respectively) are grouped together and only one complex multiplication has to performed for reducing both crosstalk interferences. The main rotated disturbing signals are then pre-rotate d and scaled as indicated in the Figure.

Third Embodiment

CORDIC Rotation

According to a third embodiment (not shown in the Figures) of the present invention any of the two previously described embodiment may be combined with the use of a vector rotation method called CORDIC (COordinate Rotation DIgital Computer) for the main rotations.

CORDIC is an iterative method for performing vector rotation, see e.g. J. E. Volder, "The CORDIC trigonometric computing technique", IRE Trans. on Electron. Computers EC-8, pp. 330–334, September, 1959. In this method a number of simple rotations that may be performed by two additions/subtractions are used. The CORDIC rotations angles are +/− $\arctan(2^{-i})$, where i is a positive integer. A rotation may be written $RE_{n+1}=RE_n-s_i 2^{-i}IM_n$ $IM_{n+1}=IM_n+s_i 2^{-i}RE_n$ Where RE is the real part and IM is the imaginary part of the vector to rotate and $s_i$ has the value +1 or −1 depending on the direction the rotation is made.

In hardware a CORDIC rotation is easy to accomplish using two adders/subtractors and two shifters. If we have fixed rotation angles, the shifting can be hardwired into the architecture and, consequently, it can be considered not to consume any extra computational resources.

The magnitude of the vector that is rotated is changed using this algorithm. However, in the present case it does not matter, since this scaling can be made in the same scaling stage that we already have in the proposed solution according to the first two embodiments.

If again a maximum error of 10% is allowed, the main rotations can be achieved by using CORDIC rotations instead of full complex multiplications. The spacing between different rotations given a 10% error becomes $2*\arcsin(0.1)=11.5$. The first CORDIC rotation angle smaller than 11.5 is 7.1 =$\arctan(2^{-3})$. To cover the space between 0 and 45 we need 6 rotations (0, 1* 7.1, 2* 7.1, ..., 6* 7.1=42.6°). The error in the calculation is then less than sin 3.6°=0.06 or 6%. The resources needed for these rotations are 6 CORDIC rotations which together have a complexity of about one half complex multiplication.

With 50 channels the number of complex multiplications are now decreased from 50*49=2450 in the exact calculation to 0.5*50=100. We still have the scaling stage so totally we have 0.5*50+50*49/2=1250, or 49% reduction in number of operations, but now with an error of only 6%.

Fourth Embodiment

Sharing of Scaling Factors

According to a fourth embodiment of the present invention any of the three previously described embodiments may be combined with the use of an inventive approximation scheme applied on the scaling stage.

Figure 9:
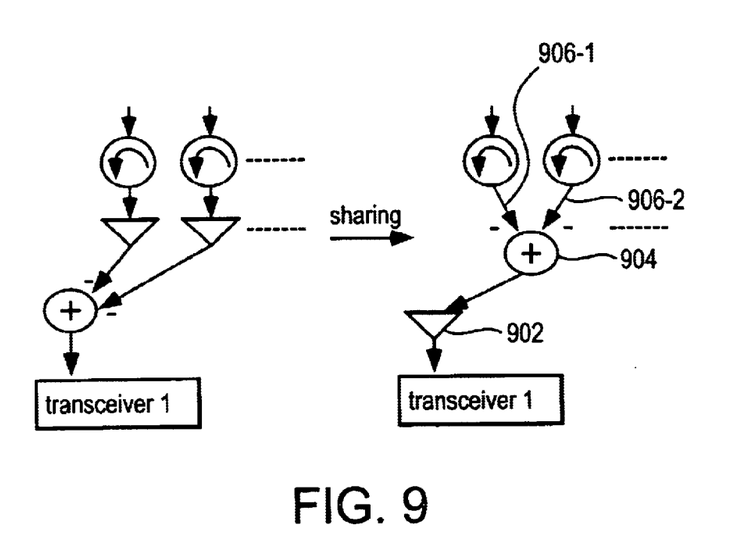
FIG. 9 illustrates the concept of sharing scaling operators according to a fourth embodiment of the present invention.

With reference to the right-hand side of FIG. 9, which illustrates this concept of sharing scaling operators among the different disturbers in combination with the second embodiment, the scaling operation 902 is performed after summation 904 of a group of pre-rotated disturbing signals 906-1, 906-2, ..., that are of about equal size, using a single scale factor. Left-hand side of FIG. 9 shows part of the conceptual diagram of FIGS. 7 and 8.

How many scaling operators that can be shared among the disturbers are very dependent on how the disturbers actually looks like, and hence we can not estimate how much we can gain using this method. Realizing the scaling with a shift operation followed by a multiplication is favorable, since the coupling may vary much between different disturbers and a high dynamic range must be supported.

It should also be noted that if scaling approximation according to the fourth embodiment of the present invention is to be applied it is more preferably combined with the rotation approximation according to the second embodiment (sharing main rotations among coupling factors of a single disturbing signal) than with the one according to the first embodiment (sharing main rotations among coupling factors of different disturbing signals interfering on a single signal) as the reduction of computation needed is greater in the first case.

This may be understood by the following reasoning. Recalling the second embodiment, a reduced number of complex multiplications are performed first, whereafter the obtained main rotated disturbing signals may be sent to the respective disturbed lines for pre-rotation, scaling and summation. Hereby, all main rotated disturbing signals that are to be scaled by factors of approximately equal size may be summed before scaling is applied.

On the other hand, if the rotation approximation is performed according to the first embodiment, the disturbing signals that interfere on a single signal are pre-rotated and scaled, whereafter subsets of those signals that are to be main rotated by approximately the same amount are formed, and the signals of each subset are summed before main rotation. Here, shared scaling is only possible to perform within each subset, giving increased computation for the same level of approximation.

The present invention, being thus described, may, of course, be applied to any communications application that employs the use of frequency translated signals. It may be implemented in transmitting transceivers, receiving transceivers or elsewhere. The given examples and embodiments of how the filtering can be made are only intended to show the potential to achieve a good result by using an approximate filter.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. In a transmission system which makes use of frequency translated signals, particularly a discrete multi tone (DMT) modulated transmission system or an OFDM (Orthogonal Frequency Division Multiplex) transmission system, having a plurality of lines and in which the modulation may be effected using a fast inverse Fourier transform (IFFT), a method for reducing crosstalk interference induced on a signal on a first line of said plurality of lines by a signal on a second line of said plurality of lines, comprising estimating a complex coupling factor for the crosstalk interference, which when multiplied by the signal on the second line estimates the induced crosstalk interference; and subtracting the estimated induced crosstalk interference from the signal on the first line; further comprising multiplying the complex coupling factor by the signal on the second line through an approximation method operating on the signal on the second line including pre-rotation, scaling, and multiplication by a complex number according to the coupling factor, said complex number being chosen from a bank of predetermined complex numbers so as to obtain the best approximation possible.

2. The method as claimed in claim 1, comprising providing an amount of complex numbers in the bank in accordance with a maximum acceptable error in the approximation.

3. The method as claimed in claim 1, comprising providing the complex numbers in the bank equally spaced.

4. The method as claimed in claim 1, comprising providing the complex numbers in the bank unequally spaced.

5. The method as claimed in claim 1, comprising providing all the complex numbers in the bank of equal amplitude.

6. The method as claimed in claim 1, comprising performing the complex multiplication by the complex number using an iterative vector rotation method.

7. The method as claimed in claim 6, comprising performing the complex multiplication by the complex number using the CORDIC vector rotation method.

8. The method as claimed in claim 1, comprising performing the pre-rotation by mirroring the signal on the second line in the real and/or the imaginary and/or the 45° axis.

9. The method as claimed in claim 1, comprising performing the scaling by multiplying the signal on the second line by a real number.

10. The method as claimed in claim 9, wherein the multiplying being preceded by a shift operation.

11. The method as claimed in claim 9, comprising choosing the real number so as to obtain the best approximation possible.

12. The method as claimed in claim 9, comprising choosing the real number as the amplitude of the coupling factor multiplied by the cosine of the angle mismatch of the chosen complex number as compared with a complex number yielding the exact estimated induced crosstalk interference.

13. The method as claimed in claim 9, comprising choosing the real number as the amplitude of the coupling factor.

14. The method as claimed in claim 9, comprising choosing the real number from a bank of predetermined real numbers so as to obtain the best approximation possible.

15. The method as claimed in claim 1, comprising the further steps of estimating a second different complex coupling factor for a crosstalk interference induced on the signal on the first line by a signal on a third line of said plurality of lines, which when multiplied by the signal on the third line estimates the induced crosstalk interference by the signal on the third line; subtracting the estimated induced crosstalk interference by the signal on the third line from the signal on the first line; and multiplying the second complex coupling factor by the signal on the third line through an approximation method operating on the signal on the third line including pre-rotation, scaling and multiplication by the chosen complex number.

16. The method as claimed in claim 1, comprising the further steps of estimating a third different complex coupling factor for a crosstalk interference induced on a signal on a fourth line of said plurality of lines by the signal on the second line, which when multiplied by the signal on the second line estimates the induced crosstalk interference on the signal on the fourth line; subtracting the estimated induced crosstalk interference on the signal on the fourth line from the signal on the fourth line; and multiplying the third complex coupling factor by the signal on the second line through an approximation method operating on the signal on the second line including pre-rotation, scaling and multiplication by the chosen complex number.

17. In a transmission system which makes use of frequency translated signals, particularly a discrete multi tone (DMT) modulated transmission system or an OEDM (Orthogonal Frequency Division Multiplex) transmission system, in which the modulation may be effected using a fast inverse Fourier transform (IFFT), a method for reducing crosstalk interference induced on a signal $S_N$ on a first line N by signals $D_1, \ldots, D_{N-1}$, each on a respective line $1, \ldots, N-1$, comprising the steps of:

(i) associating a coupling factor $\alpha'_{1\_N}, \ldots, \alpha'_{N-1\_N}$ with the respective line $1, \ldots, N-1$, said coupling factor $\alpha'_{j\_N}$, $1 \leq j \leq N-1$, being a complex number and when multiplied by the signal $D_j$, $1 \leq j \leq N-1$, on its associated line j, $1 \leq j \leq N-1$, estimating the crosstalk interference $I_{j\_N}$ induced on the signal $S_N$ on the first line N by the signal $D_j$ on its associated line j;

(ii) reducing the crosstalk interference $I_N$ on the signal $S_N$ on the first line N by subtracting an estimated crosstalk interference $I'_N$ from the signal $S_N$ on the first line N, said estimated crosstalk interference $I'_N$ being computed from said coupling factors $\alpha'_{1\_N}, \ldots, \alpha'_{N-1\_N}$, and said signals $D_1, \ldots, D_{N-1}$ on the respective line $1, \ldots, N-1$;

(iii) pre-rotating and scaling each of the signals $D_1, \ldots, D_{N-1}$ on the respective line $1, \ldots, N-1$ according to the coupling factor $\alpha'_{1\_N}, \ldots, \alpha'_{N-1\_N}$ associated with the respective line;

(iv) summing all of the pre-rotated and scaled signals $D^*_1, \ldots, D^*_{N-1}$, obtained in (iii); and (v) multiplying the sum $\Sigma D^*$ obtained in (iv) by a single complex number $\beta_N$, which product is used as the estimated crosstalk interference $I'_N$ in step (ii).

18. The method as claimed in claim 17, comprising performing the pre-rotating of each of the signals $D_1, \ldots, D_{N-1}$ on the respective line $1, \ldots, N-1$ according to the coupling factor $\alpha'_{1\_N}, \ldots, \alpha'_{N-1\_N}$ associated with the respective line by mirroring each of the signals $D_1, \ldots, D_{N-1}$ in the real and/or the imaginary and/or the 45° axis.

19. The method as claimed in claim 17, comprising performing the multiplying of the sum $\Sigma D^*$ by the single complex number $\beta_N$ by using an iterative vector rotation method, particularly the CORDIC vector rotation method.

20. The method as claimed in claim 17, comprising performing the scaling of each of the signals $D_1, \ldots, D_{N-1}$ on the respective line $1, \ldots, N-1$ according to the coupling factor $\alpha'_{1\_N}, \ldots, \alpha'_{N-1\_N}$ associated with the respective line by multiplying each of the signals $D_1, \ldots, D_{N-1}$ by respective real numbers chosen from a bank of predetermined real numbers so as to obtain the best approximation possible.

21. In a transmission system which makes use of frequency translated signals, particularly a discrete multi tone (DMT) modulated transmission system or an OFDM (Orthogonal Frequency Division Multiplex) transmission system, in which the modulation may be effected using a fast inverse Fourier transform (IFFT), a method for reducing crosstalk interferences induced by a signal $D_N$ on a first line N on signals $S_1, \ldots, S_{N-1}$ on a respective line $1, \ldots, N-1$, comprising the steps of:

(i) associating coupling factors $\alpha'_{N\_1}, \ldots, \alpha'_{N\_N-1}, \ldots, \alpha'_{N\_N-1}$ with the first line N, each of said coupling factors being a complex number and when multiplied by the signal $D_N$ on the first line N estimating the respective crosstalk interference $I_{N\_1}, \ldots, I_{N\_N-1}$ induced on each of the signals $S_1, \ldots, S_{N-1}$ on the respective line $1, \ldots, N-1$ by the signal $D_N$ on the first line N;

(ii) reducing the respective crosstalk interference $I_{N\_1}, \ldots, I_{N\_N-1}$ on each of the signals $S_1, \ldots, S_{N-1}$ on the respective line $1, \ldots, N-1$ by subtracting a respective estimated crosstalk interference $I'_{N\_1}, \ldots, I'_{N\_N-1}$ from each of the signals $S_1, \ldots, S_{N-1}$ on the respective line $1, \ldots, N-1$, said respective estimated crosstalk interference $I'_{N\_1}, \ldots, I'_{N\_N-1}$ being computed from the respective coupling factor $\alpha'_{N\_1}, \ldots, \alpha'_{N\_N-1}$, and the signal $D_N$ on the first line N;

(iii) multiplying the signal $D_N$ on the first line N by a single complex number $\beta_N$ yielding a product $D^{**}_N$;

(iv) replicating the product $D^{}_N$ for obtaining N−1 equal products $D^{}_{N\_1}, \ldots, D^{**}_{N\_N-1}$;

(v) pre-rotating and scaling the respective product $D^{}_{N\_1}, \ldots, D^{}_{N\_N-1}$ according to the respective coupling factor $\alpha'_{N\_1}, \ldots, \alpha'_{N\_N-1}$; and (vi) using the respective pre-rotated and scaled products obtained in (v) as the respective estimated crosstalk interference $I'_{N\_1}, \ldots, I'_{N\_N-1}$ in step (ii).

22. The method as claimed in claim 21, comprising performing the pre-rotating of the respective product $D^{}_{N\_1}, \ldots, D^{}_{N\_N-1}$ according to the respective coupling factor $\alpha'_{N\_1}, \ldots, \alpha'_{N\_N-1}$ by mirroring the respective product $D^{}_{N\_1}, \ldots, D^{}_{N\_N-1}$ in the real and/or the imaginary and/or the 45° axis.

23. The method as claimed in claim 21, comprising performing the multiplying of the signal $D_N$ on the first line N by the single complex number $\beta_N$ by using an iterative vector rotation method, particularly the CORDIC vector rotation method.

24. The method as claimed in claim 21, comprising performing the scaling of the respective product $D^{}_{N\_1}, \ldots, D^{}_{N\_N-1}$ according to the respective coupling factor $\alpha'_{N\_1}, \ldots, \alpha'_{N\_N-1}$, and by multiplying the respective product $D^{}_{N\_1}, \ldots, D^{}_{N\_N-1}$ by a respective real number chosen from a bank of predetermined real numbers so as to obtain the best approximation possible.

25. In a transmission system which makes use of frequency translated signals, particularly a discrete multi tone (DMT) modulated transmission system or an OFDM (Orthogonal Frequency Division Multiplex) transmission system, in which the modulation may be effected using a fast inverse Fourier transform (IFFT), a device for reducing crosstalk interference provided with means for performing the method as claimed in claim 1.

26. In a transmission system which makes use of frequency translated signals, particularly a discrete multi tone (DMT) modulated transmission system or an OFDM (Orthogonal Frequency Division Multiplex) transmission system, in which the modulation may be effected using a fast inverse Fourier transform (IFFT), a transceiver comprising the device as claimed in claim 25.

27. A transmission system which makes use of frequency translated signals, particularly a discrete multi tone (DMT) modulated transmission system or an OFDM (Orthogonal Frequency Division Multiplex) transmission system, in which the modulation may be effected using a fast inverse Fourier transform (IFFT), comprising the device as claimed in claim 25.

28. A transmission system which makes use of frequency translated signals, particularly a discrete multi tone (DMT) modulated transmission system or an OFDM (Orthogonal Frequency Division Multiplex) transmission system, in which the modulation may be effected using a fast inverse Fourier transform (IFFT), comprising the the transceiver as claimed in claim 26.

* * * * *